(12) United States Patent
Vartiainen et al.

(10) Patent No.: US 9,859,762 B2
(45) Date of Patent: Jan. 2, 2018

(54) ELECTRIC MACHINE WITH POLE ARRANGEMENT

(71) Applicant: ABB TECHNOLOGY AG, Zürich (CH)

(72) Inventors: Ari Vartiainen, Vantaa (FI); Pekka Kanninen, Espoo (FI); Petri Mäki-Ontto, Espoo (FI)

(73) Assignee: ABB Schweiz AG, Baden (CH)

( * ) Notice: Subject to any disclaimer, the term of this patent is extended or adjusted under 35 U.S.C. 154(b) by 563 days.

(21) Appl. No.: 14/525,291

(22) Filed: Oct. 28, 2014

(65) Prior Publication Data

US 2015/0061427 A1    Mar. 5, 2015

Related U.S. Application Data

(63) Continuation of application No. PCT/EP2013/058856, filed on Apr. 29, 2013.

(30) Foreign Application Priority Data

May 2, 2012    (EP) .................... 12166355

(51) Int. Cl.
*H02K 9/00* (2006.01)
*H02K 9/06* (2006.01)
(Continued)

(52) U.S. Cl.
CPC .............. *H02K 1/30* (2013.01); *H02K 1/2773* (2013.01); *H02K 1/28* (2013.01); *H02K 1/32* (2013.01); *H02K 1/325* (2013.01); *H02K 9/02* (2013.01)

(58) Field of Classification Search
CPC .................................. H02K 1/27; H02K 9/22
(Continued)

(56) References Cited

U.S. PATENT DOCUMENTS 3,567,974 A  *  3/1971  Spingler ................. H02K 1/17
                                                      310/154.18
4,445,062 A      4/1984  Glaser
                         (Continued)

FOREIGN PATENT DOCUMENTS

CN        1957514 A      5/2007
CN      101188369 A      5/2008
                (Continued)

OTHER PUBLICATIONS

English Translation of Office Action (Reasons) dated Sep. 9, 2015, by the Japanese Patent Office in corresponding Japanese Patent Application No. 2015-5093993. (3 pages).

(Continued)

*Primary Examiner* — Jose Gonzalez Quinones
(74) *Attorney, Agent, or Firm* — Taft Stettinius & Hollister LLP (57) ABSTRACT

An electric machine can include a stator, a rotor frame and a pole arrangement with: plural segment pieces disposed circumferentially around, and fastened to, the rotor frame; permanent magnet pieces positioned on inclined side edges of each segment piece; and plural pole pieces disposed circumferentially around the rotor frame and disposed alternatingly with the segment pieces. The magnet pieces are pressed between inclined side edges of the pole pieces and the inclined side edges of the segment pieces. The segment pieces, the permanent magnet pieces and the pole pieces form a closed ring around the outer surface of the rotor frame, with plural such rings being arranged after each other in an axial direction. An axial air channel can pass through the rings, and at least one radial air duct (R1, R2) between the rings.

10 Claims, 5 Drawing Sheets

(51) Int. Cl.
*H02K 1/30* (2006.01)
*H02K 1/27* (2006.01)
*H02K 1/28* (2006.01)
*H02K 1/32* (2006.01)
*H02K 9/02* (2006.01)

(58) Field of Classification Search
USPC .......................................... 310/52, 58–59, 61
See application file for complete search history.

(56) References Cited

U.S. PATENT DOCUMENTS

| | | | |
|---|---|---|---|
| 4,464,596 | A | 8/1984 | Miller et al. |
| 6,879,075 | B2 | 4/2005 | Calfo et al. |
| 7,619,342 | B2 | 11/2009 | Malmberg |
| 8,362,661 | B2 | 1/2013 | Deblock et al. |
| 2003/0173853 | A1* | 9/2003 | Knauff ................ H02K 1/2773 310/156.56 |
| 2006/0255679 | A1 | 11/2006 | Dine et al. |
| 2007/0228858 | A1 | 10/2007 | Malmber |
| 2008/0129129 | A1 | 6/2008 | Kori et al. |
| 2008/0231135 | A1 | 9/2008 | Suzuki et al. |
| 2011/0181137 | A1* | 7/2011 | Kori ........................ H02K 9/12 310/59 |
| 2012/0086291 | A1 | 4/2012 | Deblock et al. |
| 2013/0009496 | A1 | 1/2013 | Maki-Ontto et al. |

FOREIGN PATENT DOCUMENTS

| | | | | |
|---|---|---|---|---|
| CN | 101764468 | A | 6/2010 | |
| CN | 203056718 | U | 7/2013 | |
| JP | 10-336929 | A | 12/1998 | |
| JP | 2008099479 | A * | 4/2008 | |
| JP | 2011229263 | A | 11/2011 | |
| JP | 2012085517 | A | 4/2012 | |
| WO | 2005117235 | A1 | 12/2005 | |
| WO | WO 2005/117235 | A1 | 12/2005 | |
| WO | WO 2011/073520 | A2 | 6/2011 | |
| WO | WO 2011/116777 | A1 | 9/2011 | |
| WO | WO 2011116777 | A1 * | 9/2011 | .......... H02K 1/2766 |
| WO | 2013/164298 | A1 | 11/2013 | |

OTHER PUBLICATIONS

Office Action dated Feb. 4, 2015, by the Chinese Patent Office in corresponding Chinese Patent Application No. 201210511118.1, and an English Translation of the Office Action. (15 pages).

Office Action dated Feb. 16, 2016, by the Korean Patent Office in corresponding Korean Patent Application No. 10-2014-7031168. (6 pages).

International Search Report (PCT/ISA/210) dated Aug. 21, 2013, by the European Patent Office as the International Searching Authority for International Application No. PCT/EP2013/058856.

International Preliminary Report on Patentability (PCT/IPEA/409) dated Aug. 25, 2014 for International Application No. PCT/EP2013/058856.

European Search Report dated Oct. 24, 2014.

* cited by examiner

ELECTRIC MACHINE WITH POLE ARRANGEMENT

RELATED APPLICATIONS

This application claims priority as a continuation application under 35 U.S.C. §120 to PCT/EP/2013/058856, which was filed as an International Application on Apr. 29, 2013 designating the U.S., and which claims priority to European Application 12166355.3 filed in Europe on May 2, 2012. The entire contents of these applications are hereby incorporated by reference in their entireties.

FIELD

The present disclosure relates to an electric machine.

BACKGROUND INFORMATION

JP patent publication 10-336929 discloses an electric machine. A plurality of seat plates are arranged on a circumference of a yoke at intervals in the circumferential direction and fastened with first bolts to the yoke. Magnet pieces are placed on the seat plates and a laminate obtained by laminating thin steel plates is placed as a pressing member on the magnet pieces. The magnet pieces are clamped between the laminate and the seat plates by the fastening force of second bolts. The magnet pieces, the laminate, the seat plates and the second bolts include a magnetic block.

U.S. Pat. No. 6,879,075 discloses a permanent magnet synchronous machine. A circumferentially oriented rotor assembly is provided with alternating permanent magnets and magnetic pole pieces. In order to reduce the amount of leakage flux in the rotor and increase the effective length of the permanent magnet, a trapezoidal or otherwise tapered permanent magnet structure is used. By alternating trapezoidal permanent magnet and magnet pole pieces, a higher intensity magnetic field is created in the air gap utilizing the same radial space in the motor without altering the weight or volume of the motor compared to known machines.

U.S. Pat. No. 3,567,974 discloses a permanent magnet electric machine. FIG. 4 shows permanent magnet blocks fastened between wedge-shaped pole cores and abutment members. The abutment members form conjointly with the iron structure of the rotor a supporting star structure into which the permanent magnets and the pole cores are placed. The pole cores are fastened with non-ferromagnetic screws to the rotor.

SUMMARY

An electric machine is disclosed, comprising: a cylindrical stator; a cylindrical, rotatable rotor frame within the stator, said rotor frame having an outer surface and an axial direction (A-A); and a pole arrangement on the outer surface of the rotor frame, wherein the pole arrangement includes a plurality of segment pieces disposed circumferentially around the outer surface of the rotor frame, a plurality of pole pieces disposed circumferentially around the outer surface of the rotor frame and disposed alternatingly with said segment pieces, and permanent magnet pieces positioned between the segment pieces and the pole pieces, the segment pieces, the permanent magnet pieces and the pole pieces forming a continuous ring around the outer surface of the rotor frame, the electric machine having a plurality of such rings after each other in the axial direction (A-A), wherein: each segment piece includes a first inner edge seated against the outer surface of the rotor frame, a second opposite outer edge facing towards the stator, and side edges between the first inner edge and the second outer edge, the side edges having inclined portions at the second outer edge receiving the permanent magnet pieces, each segment piece being fastened with a first bolt to the rotor frame; each pole piece includes a first inner edge facing towards the outer surface of the rotor frame, a second outer edge facing towards the stator, and inclined side edges between the first inner edge and the second outer edge, each pole piece being fastened with a second bolt to the rotor frame, whereby the permanent magnet pieces are pressed between the inclined side edges of the pole pieces and the inclined portions of the side edges of the segment pieces when the second bolt is tightened; and at least one axial air channel (A1, A2) passes through the rings and at least one radial air duct (R1, R2) passes between the rings.

BRIEF DESCRIPTION OF THE DRAWINGS

In the following discussion, features and advantages of the invention will be described in greater detail by way of exemplary preferred embodiments with reference to the attached drawings, in which.

DETAILED DESCRIPTION

An electric machine with an improved pole arrangement is disclosed.

As disclosed herein, an electric machine can include a cylindrical stator, a cylindrical, rotating rotor frame within the stator, the rotor frame having an outer surface and an axial direction, and a pole arrangement on the outer surface of the rotor frame, wherein the pole arrangement includes a plurality of segment pieces disposed circumferentially around the outer surface of the rotor frame, a plurality of pole pieces disposed circumferentially around the outer surface of the rotor frame and disposed alternatingly with the segment pieces, and permanent magnet pieces between the segment pieces and the pole pieces, the segment pieces, the permanent magnet pieces and the pole pieces forming a continuous ring around the rotor frame, the electric machine having a plurality of such rings after each other in the axial direction.

An electric machine as disclosed herein can include features such as:
each segment piece has a first inner edge seated against the outer surface of the rotor frame, a second opposite outer edge facing towards the stator, and side edges between the first inner edge and the second outer edge, the side edges having at the second outer edge inclined portions receiving the permanent magnet pieces, each segment piece being fastened with a first bolt to the rotor frame;
each pole piece has a first inner edge facing towards the outer surface of the rotor frame, a second outer edge facing towards the stator, and inclined side edges between the first inner edge and the second outer edge, each pole piece being fastened with a second bolt to the rotor frame, whereby the magnet pieces are pressed between the inclined side edges of the pole pieces and the inclined portions of the side edges of the segment pieces when the second bolt is tightened; and/or at least one axial air channel passes through the rings and at least one radial air duct passes between the rings.

Exemplary pole arrangements as disclosed herein can result in a reliable fastening of the segment pieces, the pole pieces and the permanent magnets to the rotor frame.

Pole arrangements as disclosed herein can also result in a minimized leakage flux at the upper and lower ends of the permanent magnets.

Pole arrangements as disclosed herein can also result in axial air channels passing through the machine and radial air ducts enabling efficient cooling of the machine.

Figure 1:
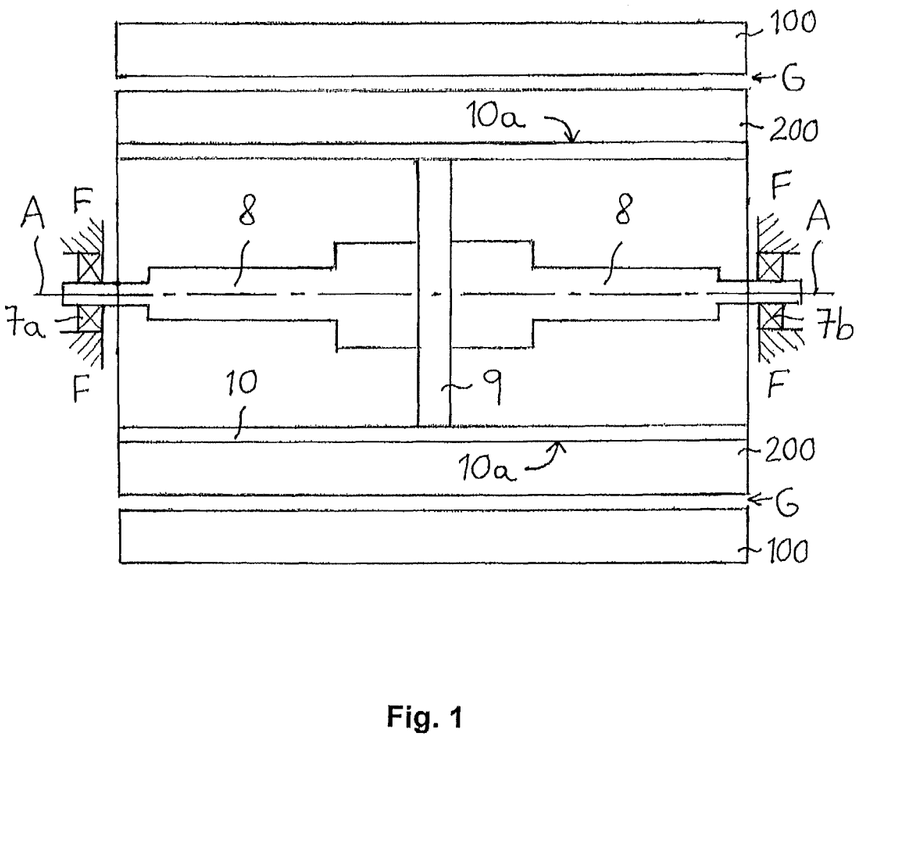
FIG. 1 shows an axial cross section of an exemplary electric machine.

FIG. 1 shows an axial cross section of an exemplary electric machine. The electric machine includes a cylindrical stator 100 and a cylindrical, rotating rotor frame 10 within the stator 100, the cylindrical rotor frame 10 having an outer surface 10a and an axial direction A-A. The electric machine can further include a pole arrangement 200 on the outer surface 10a of the rotor frame 10. There is an air gap G between the inner surface of the stator 100 and the outer surface of the pole arrangement 200. The cylindrical rotor frame 10 includes a radial partition wall 9 in the middle of the axial direction A-A of the cylinder. A rotor shaft 8 is fastened to the radial partition wall 9, the rotor shaft 8 being supported by bearings 7a, 7b at each end to the frame structures F of the electric machine. The rotor frame 10 is for example of a non-magnetic material.

Figure 2:
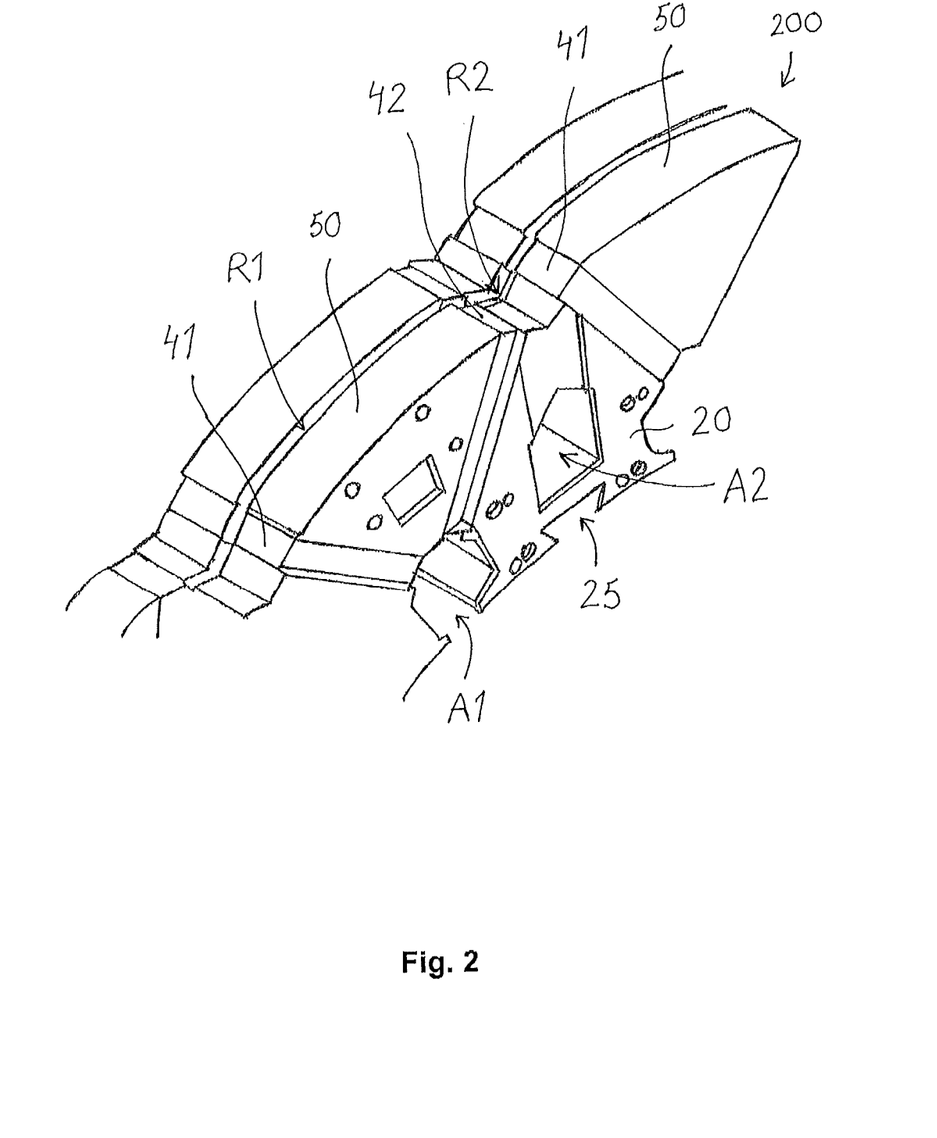
FIG. 2 shows an axonometric view of a part of a pole arrangement in an exemplary electric machine.
Figure 3:
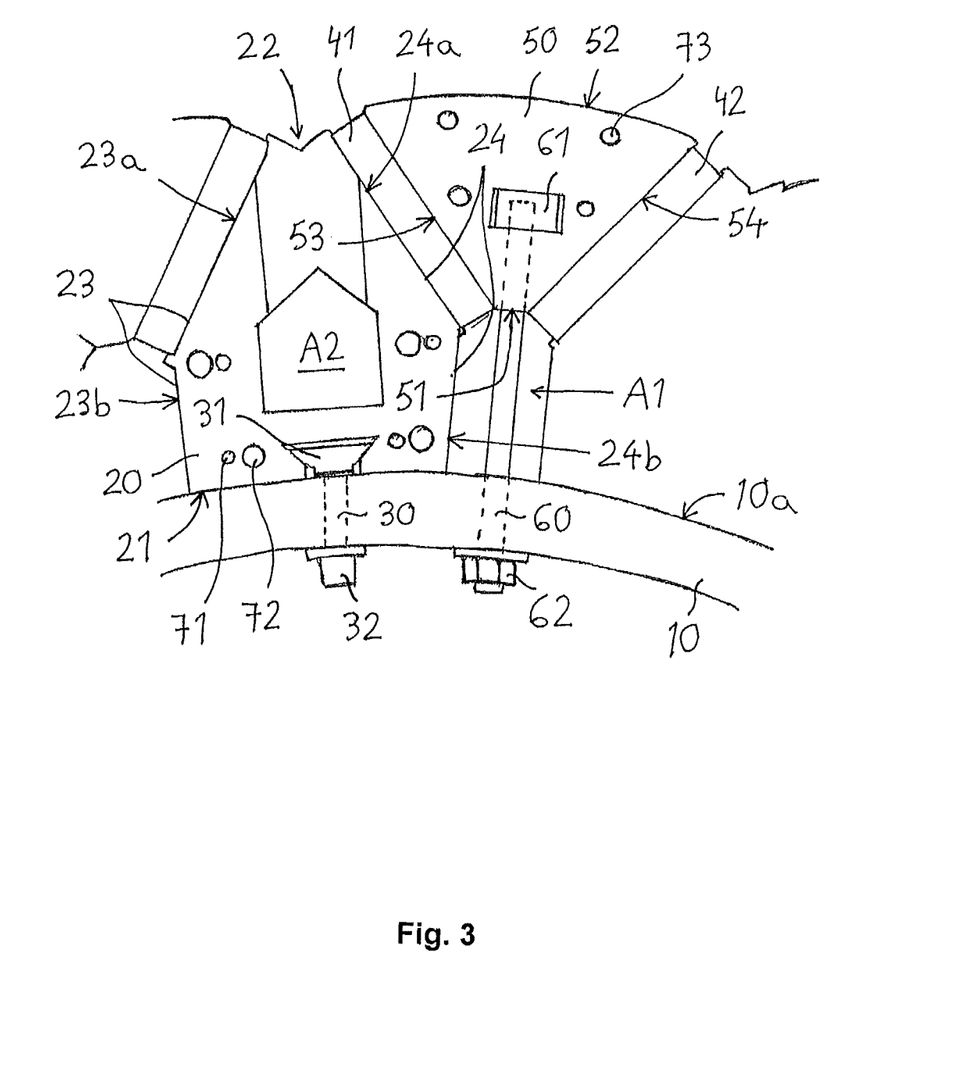
FIG. 3 shows a radial cross section of the exemplary pole arrangement shown in FIG. 1.

FIG. 2 shows an axonometric view of a part of the pole arrangement in the exemplary electric machine, and FIG. 3 shows a radial cross section of the exemplary pole arrangement shown in FIG. 1.

The pole arrangement 200 can include a plurality of segment pieces 20 disposed circumferentially around the outer surface 10a of the rotor frame 10. Each of the segment pieces 20 can include a first inner edge 21 seated against the outer surface 10a of the rotor frame 10, a second opposite outer edge 22 facing towards the stator 100, and two side edges 23, 24 between the first inner edge 21 and the second outer edge 22. The side edges 23, 24 can include inclined portions 23a, 24a at the second outer edge 22. The inclined portions 23a, 24a of the side edges 23, 24 of the segment pieces 20 can form a V so that the apex of the V faces towards the stator 100.

Each of the segment pieces 20 is fastened with a first, for example non-magnetic bolt 30 to the rotor frame 10. The first edge 21 of each segment piece 20 includes a dovetail joint 25. There can be a corresponding dovetail locking piece 31 at the upper end of the first bolt 30. The free end of the first bolt 30 extends through a hole in the rotor frame 10 to the inside of the rotor frame 10. A nut 32 can be threaded on the free end of the first bolt 30. The segment piece 20 can be secured to the rotor frame 10 by tightening the nut 32 against the inner surface of the rotor frame 10.

The pole arrangement 200 can include permanent magnet pieces 41, 42 positioned on the inclined portions 23a, 24a of the side edges 23, 24 of each segment piece 20. The permanent magnet pieces 41, 42 can for example have a rectangular form. The inclined portions 23a, 24a of the side edges 23, 24 of the segment pieces 20 can have small protrusions engaging with the side surfaces of the permanent magnet pieces 41, 42. The permanent magnets 41, 42 can be thereby locked against sliding movement along the surface of the inclined portions 23a, 24a of the side edges 23, 24 of the segment pieces 20. The width of the permanent magnet pieces 41, 42 in the axial direction can thus be a little bit smaller than the corresponding width of the pole pieces 50.

The pole arrangement 200 can include a plurality of pole pieces 50 disposed circumferentially around the outer surface 10a of the rotor frame 10 and disposed alternatingly with the segment pieces 20. Each of the pole pieces 50 can include a first inner edge 51 facing towards the outer surface 10a of the rotor frame 10, a second outer edge 52 facing towards the stator 100, and two inclined side edges 53, 54 between the first inner edge 51 and the second outer edge 52.

The first inner edge 51 can be at a radial distance from the outer surface 10a of the rotor frame 10. The second outer edge 52 forms the air gap G to the stator 100. The inclined side edges 53, 54 form a V so that the apex of the V is facing towards the rotor frame 10.

Each of the pole pieces 50 can be fastened with a second, for example non-magnetic bolt 60 to the rotor frame 10, whereby the magnet pieces 41, 42 are pressed between the inclined side edges 53, 54 of the pole pieces 50 and the inclined portions 23a, 24a of the side edges 23, 24 of the segment pieces 20 when the second bolt 60 is tightened. There can be a fastening piece 61 embedded into the pole piece 50. The second bolt 60 can be screwed into the treads of the fastening piece 61 in order to secure the second bolt 60 to the fastening piece 61 and thereby to the pole piece 50. A nut 62 can be screwed on the threads on the free end of the second bolt 60.

The pole piece 50 can be secured to the rotor frame 10 by tightening the nut 62 against the inner surface of the rotor frame 10. The inclined side edges 53, 54 of the pole piece 50 will press the permanent magnets 41, 42 against the inclined upper portions 23a, 23b of the side edges 23, 24 of the segment piece 20 when the nut 62 is tightened.

The segment pieces 20, the permanent magnet pieces 41, 42 and the pole pieces 50 form a continuous ring around the outer surface 10a of the rotor frame 10. The electric machine can include a plurality of such rings after each other in the axial direction A-A. FIG. 2 shows two axially adjacent rings, but the electric machine can have any number of rings.

The segment pieces 20 are for example composed of a plurality of thin electrical steel plates. Electrical steel is an iron alloy which may have from zero to 6.5% silicon. The electrical steel plates in the segment pieces 20 are pressed together by rivets 71 extending through the packet of electrical steel plates in the axial direction. There are further blind bores 72 in the axial side surfaces of the segment pieces 20. Every second segment piece 20 is turned around 180 degrees so that the blind bores 72 will receive the knobs of the rivets 71 of the axially adjacent segment piece 20. This means that the segment pieces 20 can be situated with the side surfaces attached to each other. The outermost metal plates in the package of metal plates are a little bit thicker in order to be stiff enough to form a straight side surface when the rivets 71 tighten the package. The thickness of the segment piece 20 in the axial direction is a little bit greater than the corresponding thickness of the pole piece 50.

The pole pieces 50 can also be composed of a plurality of thin electrical steel plates. The electrical steel plates in the pole pieces 50 can be pressed together by rivets 73 extending through the package of electrical steel plates in the axial direction. The outermost electrical steel plates in the package of electrical steel plates can be a little bit thicker in order to be stiff enough to form a straight side surface when the rivets 73 tighten the package.

A first axial air channel A1 is formed in a space restricted by the lower portions 23b, 24b of the side edges 23, 24 of two circumferentially adjacent segment pieces 20, the outer surface 10a of the rotor frame 10 and the first edge 51 of the pole piece 50. The first axial air channel A1 extends in the axial direction A-A through the whole pole arrangement 200.

A first radial air duct R1 is formed between two axially adjacent pole pieces 50. This is due to the fact that the segment pieces 20 are a little bit thicker in the axial direction A-A compared to the pole pieces 50. The first radial air duct R1 extends from the second edge 52 of the pole piece 50 into the first axial air channel A1. The first radial air duct R1 extends also between the axially adjacent side surfaces of the permanent magnet pieces 41, 42.

A second axial air channel A2 extends in the axial direction A-A through each axially adjacent segment piece 20. The second axial air channel A2 can be formed by, for example, punching an opening with a predetermined cross-section into the middle portion of each thin electrical metal plate forming the segment piece 20. The second axial air channel A2 will thus extend in the axial direction A-A through the whole pole arrangement 200.

A second radial air duct R2 can be formed between two axially adjacent segment pieces 20. The outermost metal plates in the segment pieces 20 can be formed so that a second radial air duct R2 is formed between two axially adjacent segment pieces 20. The second radial air duct R2 can extend from the second edge 22 of the segment piece 20 into the second axial air channel A2.

The area of the radial cross section of the first axial air channel A1 and the second axial channel A2 could be on the order of 20 to 35% of the area of the radial cross section of the segment piece 20. The width of the radial air ducts R1, R2 in the axial direction A-A could be on the order of 10 to 20% of the width of the segment piece 20 in the axial direction A-A.

The rotor frame in FIG. 1 can be a so called H-type rotor frame. An exemplary pole arrangement as disclosed herein can be used in any rotor frame having a cylindrical surface to which the segment pieces and the pole pieces can be fastened. The ring of segment pieces 20 and pole pieces 50 which is situated on the rotor frame 10 at the partition wall 9 cannot be secured to the rotor frame 10 with nuts 32, 62 situated inside the rotor frame 10.

The segment piece 20 can be provided with a hole extending from the second surface 22 of the segment piece 20 to a seat in the interior of the segment piece and a smaller hole extending from the seat to the first surface 21 of the segment piece 20. The segment piece 20 can be fastened with a first bolt 30 extending in the smaller hole into a thread in the partition wall 9. The first bolt 30 can be tightened with a bushing extending through the bigger hole from the second surface 22 of the segment piece 20 to the seat and the nut of the first bolt 30 on the seat. The pole pieces 50 in the ring can be fastened in a corresponding way. These holes extending to the outer surface 22 of the segment piece 20 and the outer surface of the pole piece 50 will to some extent reduce the magnetic capacity of the segment piece 20 and the pole piece 50. This is the reason for not using such a fastening arrangement in the other rings.

The upper end surfaces of the permanent magnets 41, 42 at the second edge 52 of the pole piece 50 can be freely facing to air in the air gap G between the rotor and the stator 100. The lower end surfaces of the permanent magnets 41, 42 at the first edge 51 of the pole piece 50 are freely facing to air in the first axial air channel A1. The lower portions 23b, 24b of the side edges 23, 24 of two circumferentially adjacent segment pieces 20 can have cavities below the lower ends surfaces of the permanent magnets 41, 42 in order to increase the air space below the lower surfaces of the permanent magnets 41, 42.

This arrangement can reduce (e.g., minimize) the leakage flux at the end surfaces. The fact that there is no magnetic material but instead air at the lower end surfaces of the permanent magnets 41, 42 will reduce the leakage flux at the lower end surfaces of the permanent magnets 41, 42 considerably. The leakage flux is that magnetic flux which does not cross the air gap and link to the stator winding, thus providing no useful magnetic field.

The arrangement of the permanent magnets 41, 42 and the magnetic pole pieces 50 can be advantageous in using the space in the machine. There is a higher intensity magnetic field created in the air gap utilizing the same radial space in the machine without altering the weight or volume of the machine.

Figure 4:
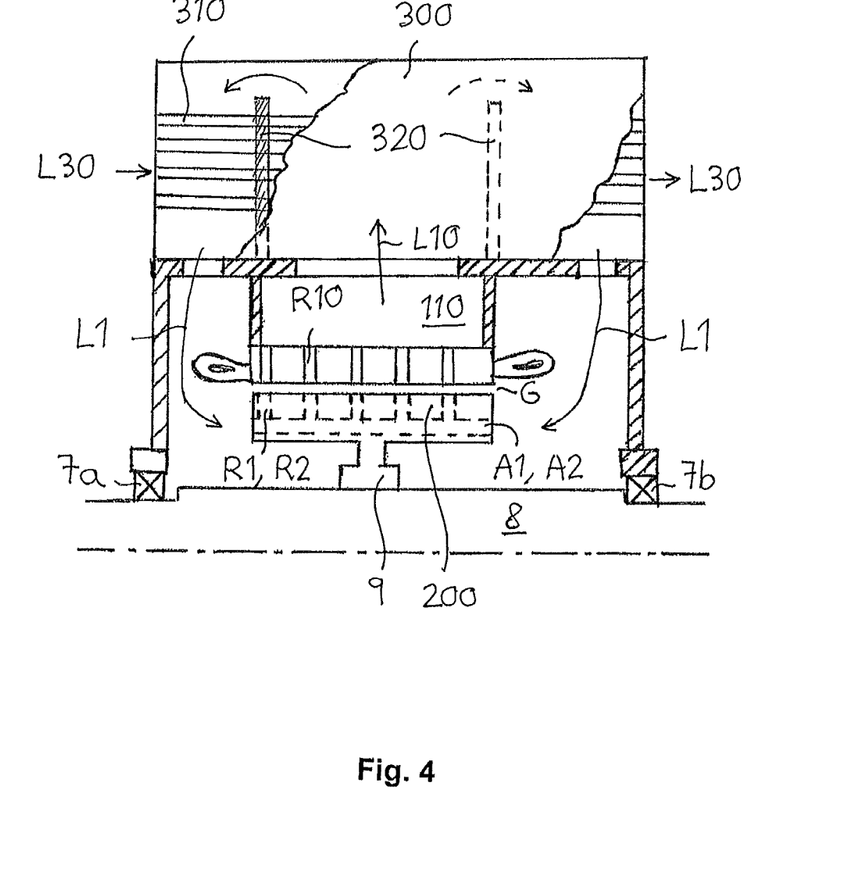
FIG. 4 shows an axial cross section of a first cooling arrangement in an exemplary electric machine.

FIG. 4 shows an axial cross section of a first cooling arrangement in an exemplary electric machine. Cooling air L1 is conducted from a ventilation housing 300 attached to the outer surface of the stator 100 towards both ends of the rotor 200. The cooling air L1 penetrates into the axial air channels A1, A2 in the rotor 100 and passes towards the middle of the rotor 100. A part of the air penetrating into the first A1 and the second A2 axial air channels will also penetrate into the first R1 and the second R2 radial air ducts in the rotor 100.

The air penetrating into the radial air ducts R1, R2 in the rotor 200 will further cross the air gap G between the rotor 200 and the stator 100 and penetrate into corresponding radial air ducts R10 in the stator 100. The radial air ducts R10 in the stator open into a stator cavity 110 and the stator cavity 110 opens into the middle portion of the ventilation housing 300. Cooling pipes 110 pass across the ventilation housing 300. A cooling liquid or cooling air L30 is conducted through the cooling pipes 310. The return air L10 passing from the stator 100 back to the middle portion of the ventilation housing 300 will pass across the cooling pipes 310 between the partition walls 320 in the ventilation housing 300 and further to the outer surface of the ventilation housing 300. The return air L10, which has been heated in the rotor 200 and the stator 100, will be cooled when passing across the cooling ducts 310. The direction of the return air L10 is changed at the outer surface of the ventilation housing 300 so that the return air L10 flows once again across the cooling pipes 310 where the air is further cooled. The cooled air L1 is then conducted back into the motor towards the ends of the rotor 200.

There is thus a closed cooling air circulation between the machine and the ventilation housing 300. This cooling air arrangement forms a symmetrical cooling of the machine.

The pole arrangement 200 on the rotor frame 10 can produce pressure when the rotor frame 10 is rotating. The radial air ducts R1, R2 work according to the same principal as the wings in a radial fan. The middle portion of the ventilation housing 300 or the end portions of the ventilation housing 300 could also be equipped with fans.

Figure 5:
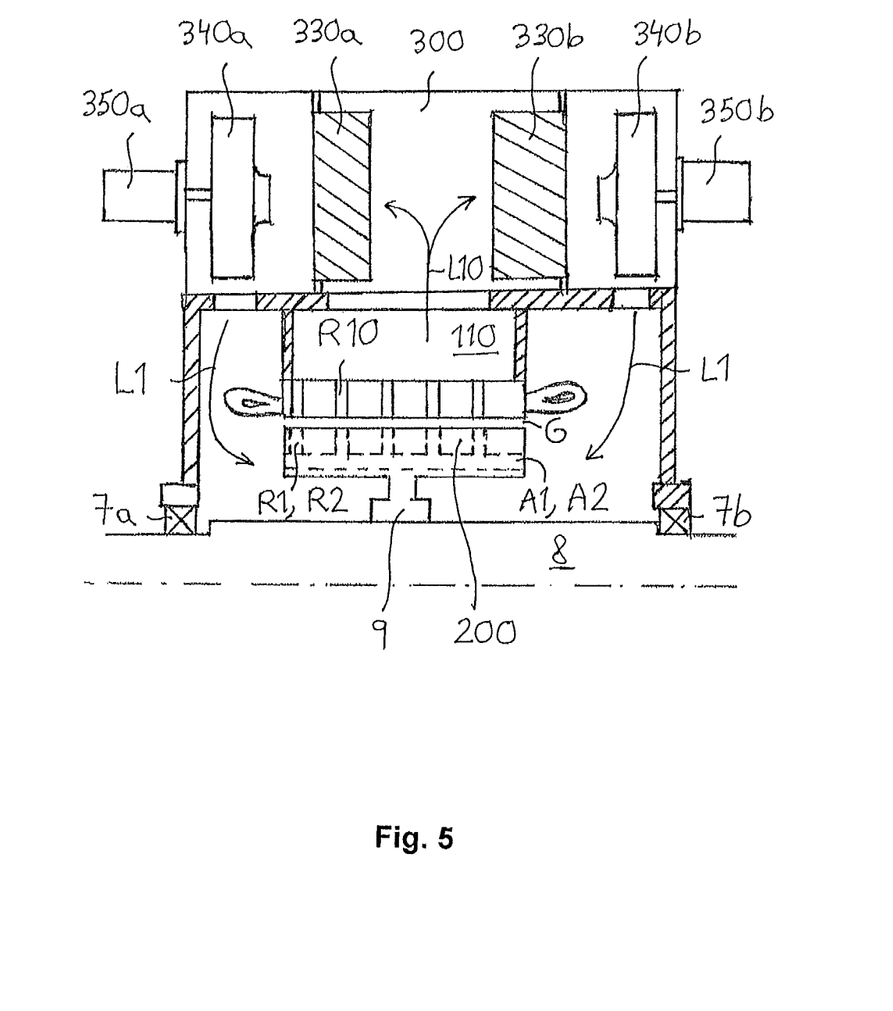
FIG. 5 shows an axial cross section of a second cooling arrangement in an exemplary electric machine.

FIG. 5 shows an axial cross section of a second cooling arrangement in an exemplary electric machine. The arrangement in the ventilation housing 300 differs from that shown in FIG. 4. The return air L10 passing from the stator housing 110 into the middle portion of the ventilation housing 300 will penetrate through a heat converter 330a, 330b to either end of the ventilation housing 300. The return air L10 is sucked through the heat exchangers 330a, 330b with radial fans 340a, 340 situated at each end of the ventilation housing 300. The radial fans 340a, 340b blow the cooled air L1 back into the machine towards the ends of the rotor 200. Each radial fan 340a, 340b is driven by a motor, such as an electric motor 350a, 350b. This cooling air arrangement can form a symmetrical cooling of the machine.

Exemplary pole arrangements disclosed herein can be especially suitable for a medium sized rather slow rotating electric machine. The rotation speed could be for example on the order of 400 rpm. The diameter of the rotor frame could be, for example, on the order of 1 m or more. Pole arrangements as disclosed herein can, however, also be used in a faster rotating electric machine in which case either end or both ends of the rotor shaft 8 could be equipped with a fan. The fan would then blow cooling air from the ventilation housing 300 to the axial air channels A1, A2 in the rotor.

The invention is not limited to the examples described herein, but may vary within the scope of the claims.

Thus, It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. An electric machine, comprising:
   a cylindrical stator;
   a cylindrical, rotatable rotor frame within the stator, said rotor frame having an outer surface and an axial direction (A-A); and
   a pole arrangement on the outer surface of the rotor frame, wherein the pole arrangement includes a plurality of segment pieces disposed circumferentially around the outer surface of the rotor frame, a plurality of pole pieces disposed circumferentially around the outer surface of the rotor frame and disposed alternatingly with said segment pieces, and permanent magnet pieces positioned between the segment pieces and the pole pieces, the segment pieces, the permanent magnet pieces and the pole pieces forming a continuous ring around the outer surface of the rotor frame, the electric machine having a plurality of such rings after each other in the axial direction (A-A), wherein:
   each segment piece includes a first inner edge seated against the outer surface of the rotor frame, a second opposite outer edge facing towards the stator, and side edges between the first inner edge and the second outer edge, the side edges having inclined portions at the second outer edge receiving the permanent magnet pieces, each segment piece being fastened with a first bolt to the rotor frame;
   each pole piece includes a first inner edge facing towards the outer surface of the rotor frame, a second outer edge facing towards the stator, and inclined side edges between the first inner edge and the second outer edge, each pole piece being fastened with a second bolt to the rotor frame, whereby the permanent magnet pieces are pressed between the inclined side edges of the pole pieces and the inclined portions of the side edges of the segment pieces when the second bolt is tightened; and
   at least one axial air channel (A1, A2) passes through the rings and at least one radial air duct (R1, R2) passes between the rings.

2. An electric machine according to claim 1, wherein the inclined portions of the side surfaces of the segment pieces form a V having an apex of the V which faces towards the stator, whereas the inclined side surfaces of the pole pieces also form a V having an apex of the V which faces towards the rotor frame.

3. An electric machine according to claim 1, wherein the pole arrangement comprises:
   a first axial air channel (A1) formed in a space restricted by lower portions of the side edges of two circumferentially adjacent segment pieces, the outer surface of the rotor frame and the first edge of the pole piece.

4. An electric machine according to claim 3, wherein the pole arrangement comprises:
   a first radial air duct (R1) formed in a space between two axially adjacent pole pieces, said first radial air duct (R1) extending from the second edge of the pole piece into the first axial air channel (A1), said first radial air duct (R1) being formed due to a width of the segment piece in the axial direction being greater than a corresponding width of the pole piece.

5. An electric machine according to claim 1, wherein the pole arrangement comprises:
   a second axial air channel (A2) extending in the axial direction (A-A) through each axially adjacent segment piece.

6. An electric machine according to claim 5, wherein the pole arrangement comprises:
   a second radial air duct (R2) formed between outer side surfaces of two axially adjacent segment pieces, said second radial air duct (R2) extending from the second edge of the segment piece into the second axial air channel (A2).

7. An electric machine according to claim 2, wherein the pole arrangement comprises:
   a first axial air channel (A1) formed in a space restricted by lower portions of the side edges of two circumferentially adjacent segment pieces, the outer surface of the rotor frame and the first edge of the pole piece.

8. An electric machine according to claim 7, wherein the pole arrangement comprises:
   a first radial air duct (R1) formed in a space between two axially adjacent pole pieces, said first radial air duct (R1) extending from the second edge of the pole piece into the first axial air channel (A1), said first radial air duct (R1) being formed due to a width of the segment piece in the axial direction being greater than a corresponding width of the pole piece.

9. An electric machine according to claim 8, wherein the pole arrangement comprises:
   a second axial air channel (A2) extending in the axial direction (A-A) through each axially adjacent segment piece.

10. An electric machine according to claim 9, wherein the pole arrangement comprises:
    a second radial air duct (R2) formed between outer side surfaces of two axially adjacent segment pieces, said second radial air duct (R2) extending from the second edge of the segment piece into the second axial air channel (A2).

* * * * *